United States Patent [19]

Nyffeler et al.

[11] Patent Number: 4,530,520
[45] Date of Patent: Jul. 23, 1985

[54] ELECTRICALLY WELDABLE BUSHINGS

[75] Inventors: Heniz Nyffeler, Recherswil; Rudolf Buri, Wynigen, both of Switzerland

[73] Assignee: Von Roll AG, Gerlafingen, Switzerland

[21] Appl. No.: 587,394

[22] Filed: Mar. 8, 1984

Related U.S. Application Data

[63] Continuation-in-part of Ser. No. 129,993, Mar. 13, 1980, abandoned.

[51] Int. Cl.³ .............................................. F16L 47/02
[52] U.S. Cl. ....................................... 285/21; 219/544
[58] Field of Search ............... 285/21, 381, 22, 423; 219/544

[56] References Cited

U.S. PATENT DOCUMENTS

| | | | |
|---|---|---|---|
| 3,943,334 | 3/1976 | Sturm | 285/21 X |
| 4,117,311 | 9/1978 | Sturm | 219/544 |
| 4,176,274 | 11/1979 | Lippera | 219/544 X |
| 4,224,505 | 9/1980 | Sturm | 285/21 X |

Primary Examiner—Thomas F. Callaghan
Attorney, Agent, or Firm—Murray Schaffer

[57] ABSTRACT

A bushing for joining the ends of fluid line conduits, or similar elements, comprising a body of thermoplastic, in which is embedded, in helical form, a resistance wire. The wire has a low coefficient of thermal expansion, permitting the thermoplastic material to melt and weld prior to the expansion thereof.

6 Claims, 2 Drawing Figures

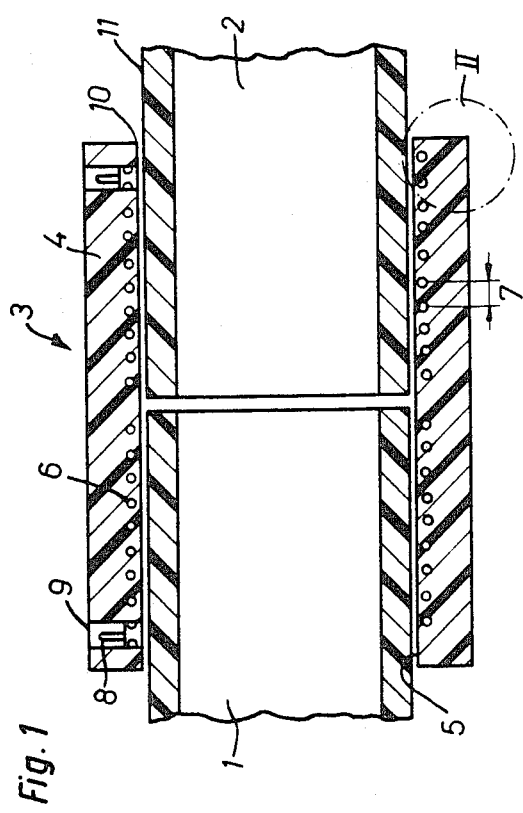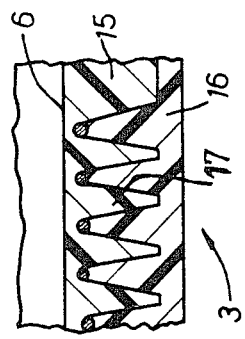

ELECTRICALLY WELDABLE BUSHINGS

RELATED APPLICATION

The present application is a continuation-in-part of Ser. No. 129,993 filed Mar. 13, 1980 and now abandoned.

BACKGROUND OF THE INVENTION

The present invention relates to electrically weldable bushings or connectors for joining plastic pipe, hose, or the like.

Fluid supply networks and conduits for other uses are frequently produced by using line or pipe elements of thermoplastic material. The problem is to assemble the line or pipe elements, including pipe sections, elbow joints, molded sections, control or valve elements and other workpieces so that they are both drip and pressure-tight at the connections. Cylindrical bushings, i.e. sleeve-shaped bushings, of thermoplastic material are generally used to join the ends or socket portions of such line elements and together with the line elements are partly melted and welded to each other. The bushing can be an integral part of the line element or it can be formed as a separate part fitting over the end of the bushing. To effect the partial melting and welding of the parts, a resistance wire is arranged in helical turns, just below the surface of the inner wall of the bushing. By supplying electrical current to this resistance wire, a predetermined amount of heat is generated, sufficient to partially melt and join the bushing body and the ends of the line elements.

In the patents to STURM, U.S. Nos. 4,224,505; 4,117,311; and, 3,943,334; and LIPPERA, U.S. No. 4,176,274, resistance wire having a high coefficient of expansion was used.

To obtain the proper amount of heat necessary for welding, known electric power supply system have been employed, furnishing electrical current proportional to the required amount of heat necessary for the embedded filamentary resistance wire to itself heat and melt the thermoplastic material. Various power supply systems are known, which not only supply the necessary current, but which maintain a given welding time, regulated to a constant voltage or constant current. Apparatus is also known having temperature measuring sensors placed on the bushing itself, to determine the heat levels. Even systems wherein the ambient temperature of the bushing is taken into account in the regulation of the welding time are known.

While the bushing, and its embedded filament resistance wire, capable of producing an electrical weld, seems to be relatively simple, care must be taken that when the filament wire is inserted in the bushing, the individual turns are spaced from each other by a sufficiently large plastic mass to positively avoid interturn short-circuiting. On the other hand, in order to obtain a good welding of the parts to each other, the bushing must be provided with a shrinkage reserve allowing it to contract under the welding operation, so that a tight fit between the bushing and the sections of the line elements to be joined, is ensured. However, while the bushing body diminishes in size during welding, the filament resistance wire, which is heated during welding, expands opposite to the shrinking movement of the bushing. These two opposite forces tend to cause breaking of the individual turns of the resistance wire and thus create breaks and/or short-circuits, so that the thermoplastic material itself, forming the bushing, may be damaged or even ignited. Furthermore, the elongation of the resistance wire, under heat, causes the turns to move away from the welding zone, that is, radially away from the welding interface. The distance the turns move can become so great that complete melting of the inner wall in the welding zone may be seriously diminished and jeopardized. Such phenomena can be observed, particularly in bushings having large diameters, for example, over 200 mm. in diameter. The thermal expansion of the resistance wire undoubtedly plays a significant role in this enlargement, since the total length of the wire turns can be considerable, for example, 10 m. or more.

Various measures have been taken to avoid the above-described difficulties, particularly in welding of bushings with large diameters. For example, the total length of a filament wire can be reduced by inserting the filament into the bushing in several independent strands or threads; even four sections are known. The total expansion of the filament wire is thus reduced, so that the risk in interturn short-circuiting is likewise reduced, but here, the electric circuit for the supply to these wires, is increased in complexity.

It has furthermore been known to use a varnish or tape insulated wire. Though the thermal expansion of the filament wire is not reduced by such insulation, the insulation tends to prevent interturn short-circuiting, should such turns in fact contact each other. The insulation of commercial filament wires, however, is so thin that it is normally not sufficient to prevent short-circuits, and therefore, insulated wire has to be custom-made.

In addition, there is a risk that varnish insulation will be charred at high filament wire temperatures, giving off, as a result, solvent vapors. These released gases lead to cavitation in the interface welding zone. By contract, no gases are usually released in a tape insulated filament wire, although it is well known that tape insulation is rather expensive and fificult to handle.

It is the object of the present invention to overcome the foregoing difficulties and to provide a weldable bushing of the type described above, in which interturn short-circuits are avoided, and the filament resistance wire turns remain stationary in their positions and prevent disturbances, particularly in bushings having large diameters.

SUMMARY OF THE INVENTION

According to the present invention, the foregoing problem is solved in providing a filamentary resistance wire, having low thermal expansion under heat. Preferably, the filament wire should have a coefficient of thermal expansion of less than $10 \times 10^{-6}/°C.$, particularly less than $2 \times 10^{-6}/°C.$ The full details of the present invention are set forth in the following disclosure, and in the accompanying drawing.

BRIEF DESCRIPTION OF THE DRAWINGS

In the accompanying drawing:

FIG. 1 is a longitudinal sectional view of two pipe ends and a connecting bushing formed in accordance with the present invention, and FIG. 2 is an enlarged view of a section of a bushing formed in two body parts.

DESCRIPTION OF THE PRESENT INVENTION

As seen in FIG. 1, the ends of a pair of pipe elements 1 and 2, are placed in end-to-end abutting relationship to each within a bushing 3. The pipe elements 1 and 2, as well as the bushing 3 are made of thermoplastic material. The bushing 3 has a sleeve-shaped body 4, into which the pipe ends can be introduced, preferably with only a small space 10 between them. In the immediate proximity of the inner wall 5 and the bushing body 4, there is embedded a filamentary resistance wire 6, in the form of a helical coil, the pitch or distance between adjacent turns having a predetermined minimal distance indicated by the numeral 7. The ends of the filamentary wire are connected to terminal contacts 8, located in radial bores 9, extending from the outer surface of the bushing body 4. The contacts 8 are adapted to be connected to supply lines of a power source (not shown) so that the filamentary wire can be supplied with a predetermined amount of electrical power sufficient to effect the welding operation.

FIG. 1 shows the ends 1 and 2 of the pipe elements and the bushing 3 before they are welded to each other. When welding power is supplied, heat is generated in the filament wire 6, leading to partial softening of the bushing, as well as the adjacent surface of the pipe ends 1 and 2, so that the parts are securely welded to each other at the interface therebetween. The thermoplastic material from which the bushing is formed is given a predetermined shrinkage reserve during its manufacture, as for example, by radially stretching or otherwise mechanically widening the bushing. This shrinkage reserve is released during the heating of the bushing, so that the bushing body 4 shrinks. This shrinkage eliminates the gap 10 existing between the inner wall 5 of the bushing and the outer wall 11 of the pipe elements. The shrinking reserve can be built chemically into the thermoplastic material as an alternative to the physical stretching of the material. The techniques for forming the shrinkage reserve are well known.

As can be seen from FIG. 1, the pitch between the turns of the wire 6 need not be evenly distributed over the length of the bushing. It is sometimes preferable that the interval between the turns be greater at the center of the bushing, and smaller at the ends, whereby a greater heat can be applied at the ends of the bushing, so as to obtain a more secure welding.

Since, as has been noted, the heating of the filament wire takes place much faster than the softening of the thermoplastic material, and thus the shrinking of the bushing, thermal expansion of the filament wire should be kept low during this relatively short time. If this is done, the appearance of interturn short-circuiting, and other deformations of the plastic material, is avoided. As soon as the bushing body has sufficiently softened and shrinkage starts, the filament wire can then expand into the softening thermoplastic material without any adverse effect. Thus, a filament wire with a low coefficient of thermal expansion is to be used. As a result of the use of a filament wire with low coefficient thermal expansion, all difficulties that would normally appear directly at the start of the heating of the filament wire are prevented.

Different alloys, having low coefficient thermal expansion, are known in wire form. Such alloys as iron-nickel, with a nickel content of 30 to 50% by weight, containing other components, e.g. cobalt, chromium, manganese, silicon, are known. Such alloys can be found under the tradenames NIVILAR and NILO, supplied by Driver-Harris Italiana S.P.A., Terrazzano di Rho (Milano) and British Thomson-Houston Co. Ltd., Rugby respectively, which leave coefficients of thermal expansion of less than $10 \times 10^{-6}/°C.$, and even lower value, namely, $1.5 \times 10^{-6}/°C.$ to $2.5 \times 10^{-6}/°C.$ Filament wire with even a lower coefficient of thermal expansion can be used. For example, wire having a coefficient of thermal expansion of 0, or even in the negative range, have been found to be extremely satisfactory. The foregoing alloys have a thermal expansion which is significantly reduced relative to the conventional and commonly used filamentary wire in the present art, as for example, that known under the tradename NIKROTHAL, supplied by Bulten-Kanthal AB, Hallstahammar/Sweden, which had been used in STURM, U.S. Pat. No. 4,117,311, Sept. 26, 1978, which has a coefficient of expansion of $16 \times 10^{-6}/°C.$ The embedment of the filamentary wires, even those of low coefficients of expansion, has presented no problem to those skilled in the art. The embedment can be made during the molding of the bushing itself, or may be threaded therein while the bushing is still in its plastic state, just after or during molding.

However, in FIG. 2, there is shown a bushing which facilitates the embedment of the filament wire. The bushing consists of two generally concentric body parts, an inner part 15, and an outer part 16. The inner part 15 has on its outside a helical thread 17, which permits the filament wire to be laid therein. After the laying or insertion of the filament wire into the troughs of the helical threading, the outer part 16 is then placed thereover, and or injection molded on the inner bushing part, so that a compact, integral bushing body is obtained. The contacts 8 are connected to the ends of the filament wire and are formed to extend through bores formed in the outer bushing part. In the construction shown in FIG. 2, the exact location of the wire and the distance between its adjacent turns can be more accurately assured, and a sufficient mass of plastic material arranged between the adjacent turns as required.

In any event, in either the construction of FIG. 1 or FIG. 2, it is possible to obtain, with the use of filament wire having a low coefficient of thermal expansion, reliable welds which are both drip-tight and pressure-tight, even with large pipe diameters, for example, 200 and 500 mm.

Various modifications of this embodiment have been disclosed, others will be apparent to those skilled in the present art. Accordingly, the present disclosure should be taken as illustrative, and not limiting of the present invention.

What is claimed is:

1. An electrically weldable bushing for connecting conduit line elements comprising a body formed of thermoplastic material, having filament wire embedded therein, said filament wire comprising a nickel-iron alloy having a coefficient of thermal expansion of less than $10 \times 10^{-6}/°C.$ 2. The bushing according to claim 1, characterized in that the filament wire has a coefficient of thermal expansion of less than $2.0 \times 10^{-6}/°C.$ 3. The bushing according to claim 2, wherein said body is cylindrical and said filament wire is embedded in a helical coil in proximity to the inner wall.

4. The bushing according to claim 3, wherein said bushing body is formed of two concentric parts, the inner part having a thread surface into which said wire is laid, and the outer part matingly conforming thereto.

5. The bushing according to claim 2, wherein said bushing body is integrally formed with a line element.

6. The bushing according to claim 1, characterized in that the filament wire has a negative coefficient of thermal expansion.

* * * * *